Patented Sept. 15, 1931

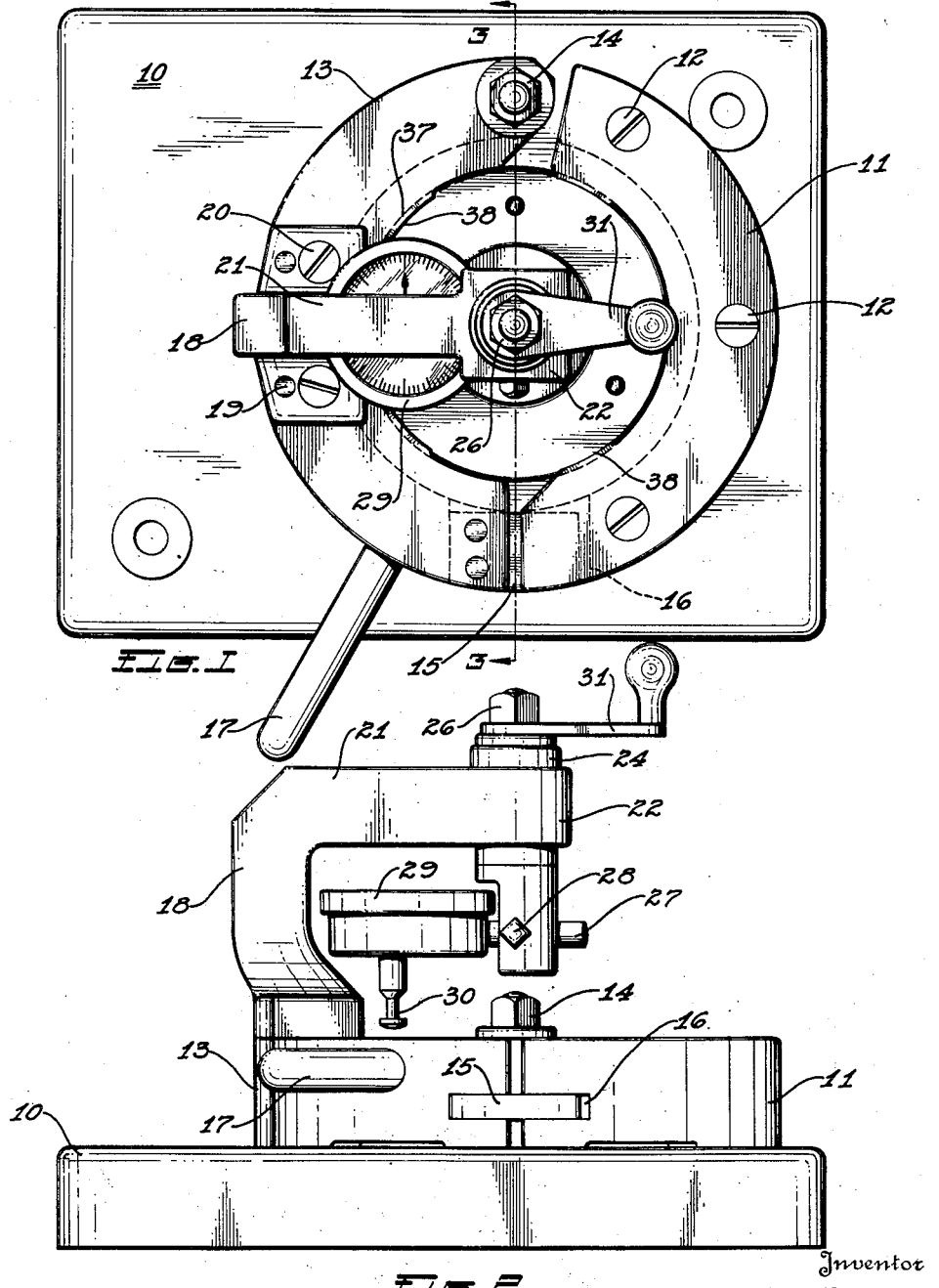

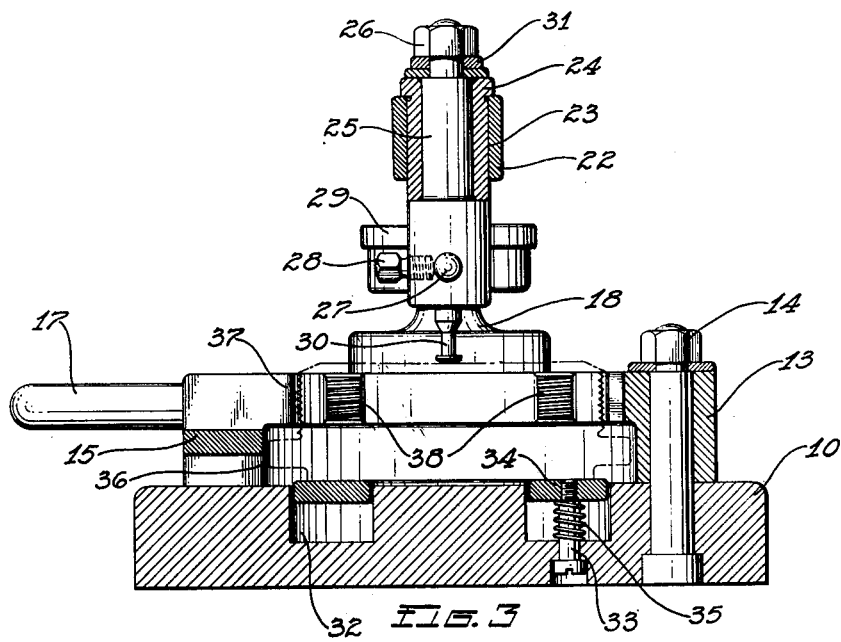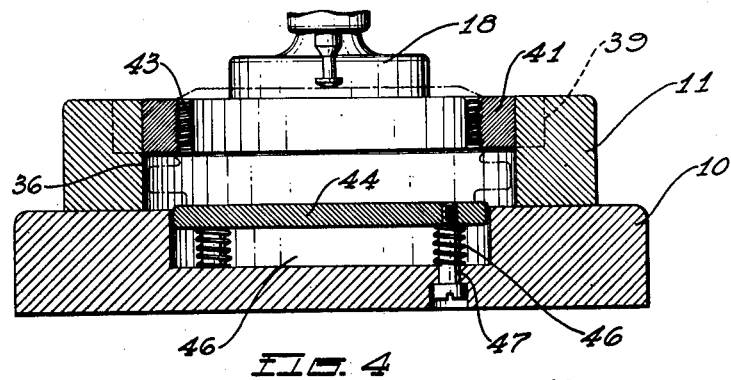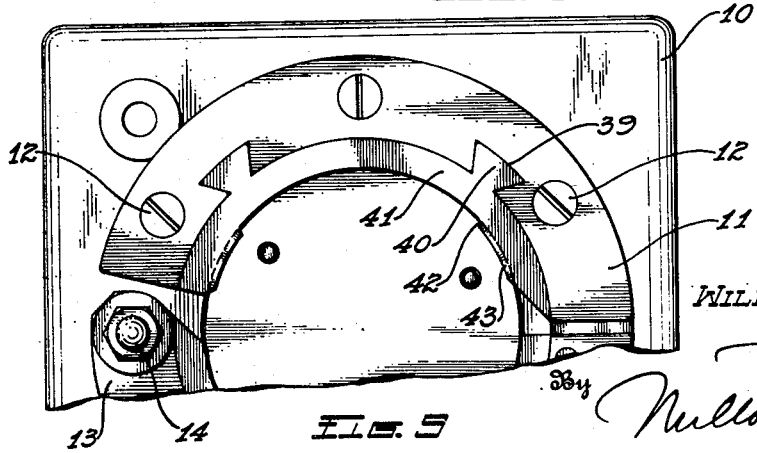

1,823,719

UNITED STATES PATENT OFFICE

WILLIAM HENRY BAKER, OF DETROIT, MICHIGAN, ASSIGNOR TO PACKARD MOTOR CAR COMPANY, OF DETROIT, MICHIGAN, A CORPORATION OF MICHIGAN

GAUGING MACHINE

Application filed December 21, 1927. Serial No. 242,660.

This invention relates to a gauging machine and more particularly to a machine for gauging threaded members.

An object of the invention is to provide a machine for gauging threaded members to ascertain the relation of the faces to the axes thereof.

Another object of this invention is to provide a machine for testing threaded members and more particularly externally threaded members to ascertain whether or not the faces of the members are normal to the axes thereof.

Another object of the invention is to provide a machine with interchangeable parts for testing externally threaded members of various sizes to ascertain whether or not the faces of the members are normal to the axes of the members.

A further object of the invention is to provide a machine for testing externally threaded members which is exceedingly cheap and simple in structure and will efficiently perform its intended function.

A still further object of the invention is to provide a machine for testing externally threaded members to ascertain whether or not the faces of the members are normal to the axes thereof and to simplify the testing so that it may be accomplished expeditiously and yet accurately.

Other objects and structural details will be apparent from the subjoined description taken in connection with the drawings which form a part of this specification and in which:

Fig. 1 is a top plan view of the complete machine,

Fig. 2 is a side elevation,

Fig. 3 is a view taken on line 3—3 of Fig. 1,

Fig. 4 is a modified form, partly in section and partly broken away, and

Fig. 5 is a fragmentary view of the modified form.

Referring to the drawings for more specific details of the invention, 10 represents a base having thereon a pair of clamping jaws comprising a substantially semi-circular member 11 pinned or bolted to the base as indicated at 12 and a substantially semi-circular member 13 pivoted on the base by means of a pivot 14. The pivoted member is provided with a tongue 15 adapted to engage a slot 16 in one end of the member 11 and the members coact to provide a circular clamp which may be opened and closed at will by means of a handle 17 threaded in the free end of the member 13. The member 13 supports a bracket 18 which is suitably secured thereto as by means of dowel pins 19 and bolts 20. This bracket has an arm 21 normal thereto and provided upon its free end with a boss 22. The boss has a perpendicular bore 23 in axial alinement with the center of the clamping members 11 and 13 when in the closed position.

A sleeve 24 is fitted in the bore and mounted in the sleeve is a shaft 25 secured in position by a nut 26 upon the upper end thereof. The lower end of the shaft has a diametral bore in which is adjustably mounted an arm 27 adapted to be locked in an adjusted position by means of a set screw 28. The arm 27 supports a standard indicating instrument 29, the contact finger 30 of which may be adjusted to contact with the upper surface of the member to be gauged or checked. The instrument is given a rotary movement over the face of the member to be gauged by means of a crank 31 attached to the upper end of the shaft 25 beneath the nut 26. Upon rotating the instrument by the crank 31 to pass the finger 30 of the instrument over the face of the member to be gauged any variations in the surface will be shown on the indicator by the rise and fall of the finger 30 in the usual manner, thus indicating whether or not the face of the threaded member is normal to the axis thereof.

As shown, the base 10 is provided with an annular groove or channel 32 having slidably mounted therein a plurality of studs 33 threaded in an annular plate 34 positioned in the annular groove or channel 32. A coil spring 35 is wound upon each of the studs between the base and annular plate to provide a cushioned seat for the plate.

The object of this structure will hereinafter appear.

In the form shown in Figs. 1, 2 and 3 the inner periphery of the jaws or members 11 and 13 are each provided with a cut away portion 36 for the accommodation of a flange, such as is frequently found upon members to be gauged, and these inner peripheral faces are further provided with projections 37 which are hardened and threaded as indicated at 38. The threaded projections are spaced apart as best indicated in Fig. 3 and are provided with a profile corresponding to the threads on the member to be gauged. They contact or engage the member at several points around its periphery when the jaws are clamped thereupon and support the member rigidly with the axis of the threaded portion in the desired position.

That the member to be gauged will readily take the proper position within the machine, it is placed on the annular member 34 with its face down and as the jaws or clamping members 11 and 13 are closed upon the member, the threads 38 upon the jaws will engage the threads upon the member to be gauged without binding or distorting either by reason of the yielding support or seat provided for the annular member permitting the tilting thereof in any direction which may be necessary to attain the accurate position of the member to be gauged.

In Fig. 4, I have shown a modified form of the invention wherein the jaws 11 and 13 are formed without the threaded portions 38 and in lieu thereof are provided with spaced grooves 39 vertically disposed to receive interlocking members 40 formed upon arcuate sections 41 having spaced projections 42 threaded as indicated at 43. These arcuate sections are made in pairs in different sizes, the object being to provide interchangeable gripping means whereby the machine may be readily made adaptable for gauging the faces of externally threaded members of various sizes, and in order to provide a suitable support for the various size members to be gauged, the annular member 34 is dispensed with and supplanted by a disk 44 mounted in a recess 45 upon springs 46 wound upon studs 47 carried by the disk and slidably mounted in the base. This yielding support may be tilted in any direction necessary in order that the threads upon the members 42 may properly coact with the threads upon the member to be gauged.

While I have herein described in some detail the specific embodiments of my invention, which I deem to be new and advantageous and may specifically claim, I do not desire it to be understood that my invention is limited to the exact details of the construction, as it will be apparent that changes may be made therein without departing from the spirit or scope of the invention.

Having thus described the various features of my invention, what I claim is new and desire to secure by Letters Patent is:

1. A gauging machine comprising a base, a stationary clamping jaw on the base, a pivotal jaw on the base coacting with the stationary jaw, a yielding support on the base, an indicating instrument and means for supporting and rotating the indicating instrument above the support.

2. A gauging machine comprising a base having a recess therein, a yielding support mounted in the recess, a stationary clamping jaw on the base adjacent the recess, a pivotal jaw on the base coacting with the stationary jaw, an indicating instrument and means for supporting and rotating the instrument above the yielding support.

3. A gauging machine comprising a base having a recess, a yielding support in the recess, a stationary arcuate jaw on the base adjacent the recess, a pivotal jaw on the base coacting with the stationary jaw, an indicating instrument and means carried by one of the jaws for supporting and rotating the indicating instrument over the yielding support.

4. A gauging machine comprising a base having a recess therein, a yielding support positioned in the recess, an arcuate stationary clamping jaw on the base, a pivotal clamping jaw coacting therewith, means for opening and closing the jaws, an indicating instrument, means whereby said instrument is carried by the pivotal jaw and means for rotating the indicating instrument.

5. A gauging machine for threaded members comprising a base having a recess, a yielding support positioned in the recess, a stationary clamping jaw on the base, a pivotal clamping jaw on the base adapted for cooperation with the stationary jaw, an interengaging means for the jaws, means operable at will for opening and closing the pivotal jaw, means upon the jaws for engaging the threads upon a member to be gauged, an indicating instrument and means carried by the pivotal jaw for supporting and rotating the indicating instrument over the yielding support.

6. A gauging machine comprising a base having a recess therein, a plate yieldingly supported in the recess, an arcuate clamping jaw secured on the base in a fixed position, an arcuate clamping jaw pivoted on the base and adapted for cooperation with the stationary clamping jaw, means operable at will for opening and closing the pivotal clamping jaw, an arm carried by the pivotal clamping jaw, an indicating instrument and means carried by the arm for rotating the indicating instrument above the yielding support.

7. A machine for gauging externally threaded members comprising a base having a recess therein, a yielding support in the recess, a stationary clamping jaw on the base adjacent the recess, a pivoted clamping jaw on the base adapted for cooperation with the stationary clamping jaw, a support carried by the pivotal jaw, an indicating instrument rotatably mounted on the support and means carried by the support for rotating the indicating instrument above the yielding support.

8. A machine for gauging externally threaded members comprising a base having a recess therein, a yielding support mounted in the recess, a clamping jaw secured on the base in a fixed position, a clamping jaw pivoted on the base and adapted for cooperation with the stationary jaw, means for inter-engaging the jaws, means operable at will for opening and closing the pivotal jaw, threaded segments on the clamping jaws adaptable for cooperation with the threads on a member to be gauged, a support carried by the pivoted jaw, an indicating instrument rotatably mounted on said support and means on the support carried by the pivoted jaw for rotating the indicating instrument over the member to be gauged.

9. A machine for gauging externally threaded members comprising a base, a yielding support on the base, clamping jaws in juxtaposition to the yielding support, threaded members on the clamping jaws adapted for cooperation with external threads on a member to be gauged, an indicating instrument and means carried by one of the clamping jaws for supporting and rotating the indicating instrument over the yielding support.

10. A machine for gauging externally threaded members comprising a base, a yielding support on the base, clamping jaws arranged in juxtaposition to the support, means operable at will for controlling the clamping jaws, threaded members on the clamping jaws adaptable for cooperation with threads on a member to be gauged, an indicating instrument and means for supporting and rotataing the indicating instrument over the yielding support.

11. A machine for gauging externally threaded members comprising a base, a yielding support positioned on the base, a stationary clamping member in juxtaposition to said support, a pivotal clamping member coacting with the stationary clamping member, means operable at will for controlling the pivotal clamping member, demountable members supported by the claming jaws, threaded means upon the demountable members for coaction with the threads upon a member to be gauged, a support on the pivotal clamping jaw, an indicating instrument rotatably carried by the support and means for rotating the indicating instrument over the member to be gauged.

12. A machine for gauging externally threaded members comprising a base, a yielding support on the base, a stationary clamping member in juxtaposition to the yielding support, a pivotal clamping member adapted for cooperation with the stationary clamping member, means operable at will for controlling the pivotal clamping member, demountable members interlocking with the clamping members, arcuate threaded portions on the demountable members adapted for engagement with the threads on a member to be gauged, a support carried by the pivoted clamping member, a shaft journaled in the support, an indicating instrument carried by the shaft and means for rotating the shaft to move the instrument over the member to be gauged.

In testimony whereof I affix my signature.

WILLIAM H. BAKER.